United States Patent

[11] 3,626,983

| [72] | Inventors | Ronald Bernard Walters<br>Wembley;<br>John Anthony Gordon Hammond,<br>Portsmouth, both of England |
|---|---|---|
| [21] | Appl. No. | 887,396 |
| [22] | Filed | Dec. 22, 1969 |
| [45] | Patented | Dec. 14, 1971 |
| [73] | Assignee | Sperry Rand Limited<br>London, England |
| [32] | Priority | Dec. 24, 1968 |
| [33] | | Great Britain |
| [31] | | 61,263/68 |

[54] SERVO VALVE
7 Claims, 1 Drawing Fig.

[52] U.S. Cl............................................137/625.64,
137/85
[51] Int. Cl......................................................F16k 11/07,
F15b 5/00

[50] Field of Search.............................................137/625.64,
625.63, 625.67, 625.61, 85

[56] References Cited
UNITED STATES PATENTS

| 2,896,588 | 7/1959 | Hayner......................... | 137/625.64 X |
| 3,089,517 | 5/1963 | Ludwig......................... | 137/625.64 X |
| 3,223,104 | 12/1965 | Cox............................... | 137/625.62 X |

*Primary Examiner*—Alan Cohan
*Attorney*—Barnes, Kisselle, Raisch & Choate

ABSTRACT: Servo valve in which movement of a flow controlling element is effected through a flapper located and movable within the flow controlling element. Compression springs also located within the flow controlling element serve to interconnect the flow controlling element and the flapper. The flow controlling device is slidable directly within a bore in the valve body.

PATENTED DEC 14 1971
3,626,983
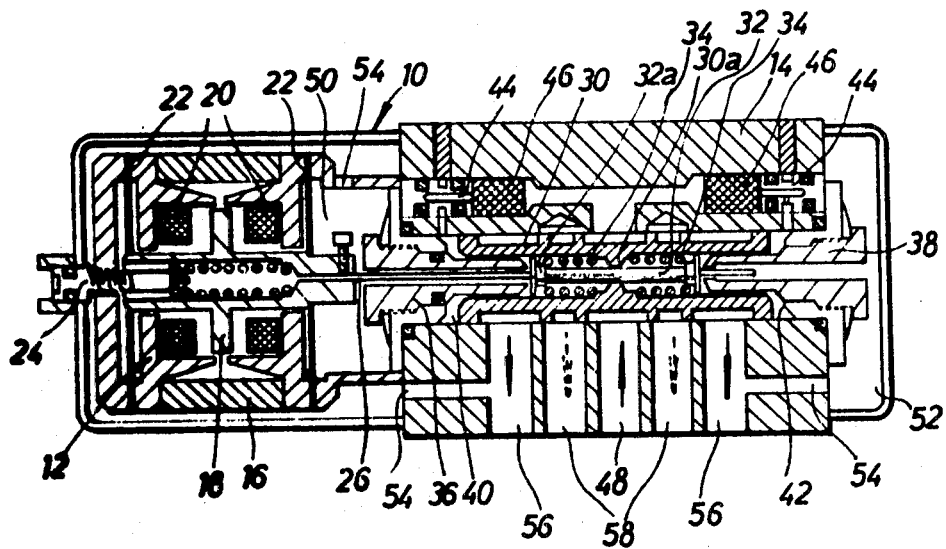
INVENTOR:
RONALD BERNARD WALTERS
ANTHONY GORDON HAMMOND
BY
Barnes, Kisselle, Raisch & Choate
ATTORNEYS

1

SERVO VALVE

This invention concerns an improved servo valve and more particularly relates to an electrohydraulic servo valve which may be of the two-stage proportional four-way type.

In electrohydraulic servo valves movement of a flow controlling element is usually effected indirectly through the movement of a flapper. The flapper is subjected to the action of one or more feedback springs and is normally separated and spaced from the flow controlling element within the valve body.

According to the present invention in an electrohydraulic servo valve the flapper is carried and moves internally within the flow controlling element. This latter is usually a spool. Conveniently also the force feedback springs for the flapper are mounted within the spool and interconnect the spool and the flapper.

In an arrangement in which the flapper serves to close and open two nozzles, the flapper includes an intermediate rod section and so as to balance the hydraulic forces on the flapper, this rod section is conveniently of the same diameter as the nozzles.

According to a preferred aspect of the present invention the spool runs directly in a bore in the valve body rather than in a special liner or sleeve of case hardened material, as has hitherto been the case. Furthermore since the flapper and associated springs are carried internally of the spool, this simplified the construction and reduces the cost of the valve. Moreover a comparatively cheap type of force motor or transducer may be used so that the valve can be produced more cheaply than has previously been the case.

The invention will now be further described by way of example with reference to the accompanying drawing, the single FIGURE of which is a longitudinal cross section through an electrohydraulic servo valve according to the present invention.

The valve casing 10 contains an electrical axial force motor 12 and the main valve body 14.

The motor 12 consists of a permanent magnet 16, an armature 18 and a control coil 20. The armature 18 is held centrally (as shown) of the magnet 16 and coil 20 by means of a pair of flexible diaphragms 22 and, on application of a unidirectional control current to coil 20, tends to be displaced to the left or right (as viewed) against the retaining force of the diaphragms 22. The direction of displacement depends on the sense of the DC supply to coil 20 and the extent of displacement will be proportional to the current supply to coil 20. A spring-loaded zero adjustment device 24 is provided for motor 12 and extends through casing 10, while a rod 26 carried by armature 18 by means of clamping screw 28 extends centrally through the valve body 14.

The valve proper consists of a spool 30 slidably displaceable within a central bore of body 14. Spool 30 is hollow and slidably accommodates therein flapper 32 which is positioned centrally therein by annular protuberance 30a projecting internally within spool 30. Flapper 20 is secured on rod 26 of the force motor armature 18 and is connected to spool 30 through the intermediary of two feedback springs 34 located on either side of protuberance 30a and each acting between it a limiting flanged collar 32a defining each end of flapper 32. Springs 34 serve to center flapper 32 within spool 30 or rather, as flapper 32 is moved by force motor 12, to center spool about flapper 32.

An adjustable nozzle 36 is mounted in valve body 14, rod 26 extending through the central bore thereof, and the flanged collar 32a of flapper 32 acting against the inlet thereof to constitute a variable orifice on movement of flapper 32. To maintain hydraulic symmetry, rod 26 extends beyond flapper 32 and passes through the bore of a second adjustable nozzle 38 which, together with the second flanged collar 32a of flapper 32 constitutes a second variable orifice on movement of flapper 32.

Mounted within valve body 14 and provided in diverging fluid paths extending from the valve inlet to control pressure chambers 40 and 42 at either end of spool 30 are fixed orifices 44 adjusted to control pressure. Filters 46 are incorporated in these diverging paths.

It should be noted that, to balance the hydraulic forces on flapper 32, the diameter of the flapper rod is the same as that of the inlet bores of nozzles 36 and 38.

In operation, hydraulic fluid at supply pressure is fed to inlet 48 and passes along the diverging paths and through filters 46 to fixed orifice valves where the pressure is adjusted to control pressure before the fluid is discharged into the control pressure chambers 40 and 42 at each end of the spool 30. These chambers spill through the orifices in nozzles 36 and 38 into spaces 50 and 52 respectively from which the fluid passes by ports 54 to outlets 56 which are connected as returns to a supply tank for the hydraulic fluid.

When motor 12 is not actuated and the valve parts are in the positions shown in the drawing the control connections 58 from the valve are not activated because of the lands on spool 30 serve to isolate inlet 48 from outlets 58. However, when a current of one particular sense is passed through the control coils 20 of the force motor 12 flapper 32 moves and one of the variable orifices at the ends of the flapper tends to be closed while the other tends to open. This results in an unbalance of pressure in chambers 40 and 42 and causes axial displacement of spool 30 until force of feedback springs 34 counterbalances the electromagnetic force of motor 12 and the flapper 32 is recentered between nozzles 36 and 38. In the displaced position of spool 30, which is no longer central about flapper 32, one or other of the load or control outlets 58 of the valve is connected to inlet 48 of hydraulic fluid which thereby passes to the machine tool, such as a jack, which is under control of the valve. Removal of the source of unidirectional current to force motor 12 causes the valve to return to the position illustrated by virtue of the inherent forces of diaphragms 22 and springs 34. Activation of motor 12 in an opposite sense causes the other load or control outlet 58 to be connected to supply inlet 48.

We claim:

1. An electrohydraulic servo valve comprising a movable flow controlling element comprising a spool, a flapper for indirectly effecting movement of the flow controlling element and spring means providing a restoring force on the flapper, wherein the flapper is carried and moves internally within the flow controlling element, a housing, an electromagnetic motor disposed at one end of the housing and including a displaceable armature, a central bore formed in the housing in alignment with the motor, port means in the wall of the bore, a spool slidable in the bore and cooperating with the ports therein to control the flow of fluid therebetween, the spool having a hollow generally cylindrical interior the axis of which is aligned with the axis of the bore, nozzle means extending into the two opposite ends of the hollow interior of the spool, flapper means including nozzle closure flanges at opposite ends of an intermediate cylindrical portion which is a close sliding fit in a neck portion of reduced diameter formed midway of the hollow interior of the spool, spring means between each flange and said neck portion and a mechanical connection between the flapper and the displaceable armature, movement of the armature producing corresponding movement of the flapper which results in an out of balance force acting on the spool resulting from unequal compression of the springs on either side thereof tending to move the spool in a direction to reduce this out of balance force.

2. A servo valve comprising a housing including walls defining a central bore and port means to said bore, an electromagnetic motor, including a displaceable armature, within the housing and aligned with the central bore, a spool slidable in said central bore and cooperating with said port means to control fluid flow passages between said port means, said spool including a hollow generally cylindrical interior the axis of which is aligned with the axis of the central bore, a neck portion of reduced diameter formed midway of the hollow interior of the spool, nozzle means extending into the two opposite ends of the hollow interior of the spool, flapper means including nozzle closure flanges at opposite ends of an intermediate cylindrical portion which is a close sliding fit in said neck portion of said spool, spring means between each nozzle closure flange and said neck portion, and a mechanical connection between said flapper means and said displaceable armature.

3. A servo valve as claimed in claim 2 and wherein said mechanical connection links said flapper means and said displaceable armature for mutual displacement.

4. A servo valve as claimed in claim 2 and wherein said armature has a neutral position and when the armature is in said neutral position said spring means between said nozzle closure flanges and said neck portion exert balanced forces on the flapper means.

5. A servo valve as claimed in claim 4 and wherein displacement of the armature from its neutral position causes out of balance forces in the spring means, which forces cause the spool to move relative to the flapper means.

6. A servo valve as claimed in claim 2 and wherein the intermediate cylindrical portion of the flapper means has a diameter equal to the diameter of the orifices of the nozzle means.

7. A servo valve mechanism as claimed in claim 2 and wherein the flapper means are secured on a rod attached to the displaceable armature and said rod passes through the orifices of said nozzle means in all positions of the armature.

* * * * *